United States Patent [19]

Oltmanns, Jr. et al.

[11] Patent Number: 4,809,825

[45] Date of Patent: Mar. 7, 1989

[54] BRAKE SHOE RETAINER

[75] Inventors: Roger W. Oltmanns, Jr., South Bend; William E. Sherman, II, Granger, both of Ind.

[73] Assignee: Allied-Signal Inc., Morristown, N.J.

[21] Appl. No.: 220,349

[22] Filed: Jul. 14, 1988

Related U.S. Application Data

[63] Continuation of Ser. No. 29,015, Mar. 23, 1987, abandoned.

[51] Int. Cl.⁴ .................... F16D 55/00; F16D 65/40
[52] U.S. Cl. ............................ 188/73.31; 188/73.38
[58] Field of Search ............ 188/73.35, 73.36, 73.37, 188/73.38, 73.33, 73.31, 73.1, 72.5

[56] References Cited

U.S. PATENT DOCUMENTS

| | | | |
|---|---|---|---|
| 3,387,687 | 6/1968 | Eggstein et al. | 188/73 |
| 3,651,898 | 3/1972 | Habgood | 188/72.5 |
| 3,917,032 | 11/1975 | Hoffman, Jr. et al. | 188/73.3 |
| 4,004,658 | 1/1977 | Margetts et al. | 188/73.5 |
| 4,174,768 | 11/1979 | Takemori | 188/72.3 |
| 4,235,314 | 11/1980 | Reagan | 188/73.5 |
| 4,335,806 | 6/1982 | Lüoertz | 188/73.33 |
| 4,385,680 | 5/1983 | DuCharme et al. | 188/72.4 |
| 4,424,886 | 1/1984 | Frigger et al. | 188/73.35 |
| 4,537,289 | 8/1985 | Von Grunberg et al. | 188/72.4 |
| 4,609,077 | 9/1986 | Nakatsuhara | 188/73.38 |
| 4,611,693 | 9/1986 | Wang | 188/73.34 |

Primary Examiner—Andres Kashnikow
Assistant Examiner—Richard Potosnak
Attorney, Agent, or Firm—Larry J. Palguta; Ken C. Decker

[57] ABSTRACT

The brake shoe retainer comprises a retainer (30) having a substantially flat portion (34) which is attached by rivets (32) to the plate (20) of the inner brake shoe (22). The substantially flat portion (34) extends into a plurality of resilient legs (36), each resilient leg (36) having an angled base portion (38) extending from the substantially flat portion (34) to a leg portion (40) disposed substantially orthogonally relative to a plane of the substantially flat portion (34). Each resilient leg (36) includes an end portion (42) extending from the leg portion (40), the end portion (42) angled inwardly toward the substantially flat portion (34). Each leg portion (40) includes a lanced dimple (44) which extends outwardly away from the substantially flat portion (34), the lanced dimple (44) capable of biting into the surface (14) of an opening (12) within a piston (10) so that the plate (20) and brake shoe (22) are coupled to the piston (10) for movement therewith.

10 Claims, 1 Drawing Sheet

BRAKE SHOE RETAINER

The present invention relates generally to a retainer for an inner brake shoe of a disc brake, particularly to a brake shoe retainer having lanced dimples.

Disc brakes include an inner brake shoe which may be supported radially by means of the caliper or a torque support member. It is advantageous to have the inner brake shoe coupled to the piston so that when the piston retracts, the inner brake shoe is also retracted away from the rotor, and thereby reducing brake drag by the inner brake shoe. In order to couple the inner brake shoe to the piston, the piston may have an opening which receives a resilient retainer attached to the inner brake shoe plate. The retainer includes a plurality of resilient legs which engage the surface of the opening within the piston. In order to provide a positive coupling together of the piston and inner brake shoe via the resilient legs, the piston may have a groove which is machined about the interior surface of the opening in the piston. Thus, the resilient legs of the retainer snap into engagement with the groove disposed in the opening of the piston. However, the machining of the groove within the opening of the piston is an expensive procedure and it is desirable that such process step be eliminated. The piston may comprise either a phenolic or a metallic piston, and the elimination of the machining step would be advantageous from the viewpoint of reducing cost and also simplifying assembly procedure by eliminating the matching up of tolerances so that the resilient legs snap properly within the machined groove.

The present invention provides a solution to the above problems by providing a retainer having a plurality of resilient legs each of which has a lanced dimple therethrough. The piston does not require a groove machined therein because the lanced dimples of the resilient legs bite into the surface of the opening in the piston when the inner brake shoe is displaced away from the piston. The present invention comprises a brake shoe retainer for coupling a brake shoe to a piston of a disc brake, the retainer comprising a substantially flat portion having reception means for receiving coupling means between the substantially flat portion and a brake shoe plate, the substantially flat portion extending into a plurality of resilient legs each of which extends away from a plane of said substantially flat portion, each leg comprising a leg portion disposed substantially orthogonally relative to said plane and the leg portion having a lanced dimple provided therein, the lanced dimple extending outwardly away from the substantially flat portion and having a curved surface disposed a predetermined distance from a plane of the leg portion so that said lanced dimple will engage an inner surface portion of an opening within the piston, the lanced dimple biting into said surface portion when the brake shoe plate is displaced away from said piston so that said retainer couples said brake shoe plate to said piston for movement therewith.

One way of carrying out the invention is described in detail with reference to the drawings which illustrate an embodiment in which.

Figure 1:
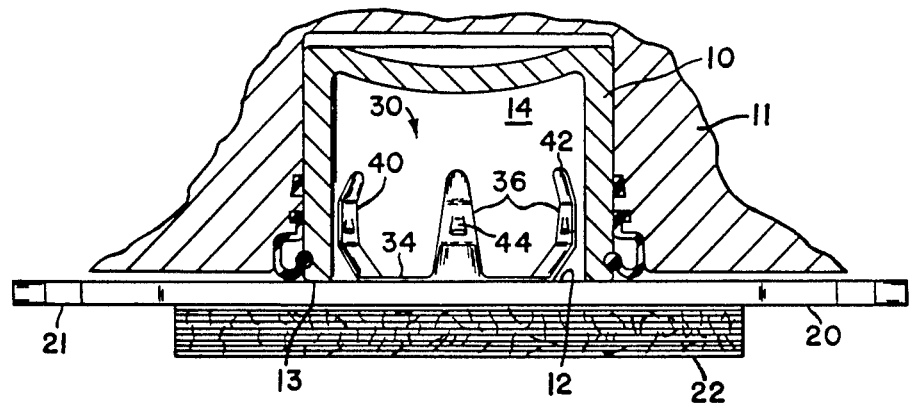
FIG. 1 is a section view of the piston, brake shoe plate and retainer.
Figure 2:
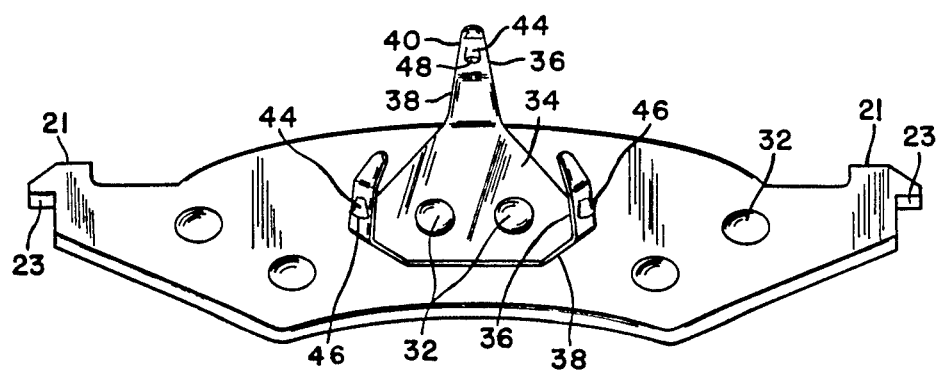
FIG. 2 is an isometric view of the brake shoe plate and retainer.

FIG. 1 illustrates in section view a brake piston 10 which may have an opening 12 which communicates with an inner piston surface 14. A brake shoe plate 20 supports a brake shoe 22 attached thereto and a retainer indicated generally by reference numeral 30. Retainer 30 is attached to inner brake shoe plate 20 by means of rivets 32 which extend through plate 20. The retainer 30 comprises a substantially flat portion 34 which extends into three resilient legs 36. Each resilient leg 36 comprises an angled base portion 38 which extends outwardly away from the flat portion 34, a leg portion 40 which is disposed substantially orthogonally relative to the flat portion 34, and an end portion 42 which is angled inwardly toward the substantially flat portion 34. Each leg portion 40 includes a lanced dimple or protrusion 44 which is formed by a punch operation wherein the lanced dimple extends outwardly away from the substantially flat portion 34. The lanced dimples 44 have a bottom portion with a curved surface which extends away from the plane of the leg portion 40, so that a hole 48 is created adjacent thereto. Because each leg portion 40 is substantially orthogonal relative to flat portion 34 and therefore parallel to inner piston surface 14 as shown in FIG. 1, only the curved surface of each bottom portion 46 engages the surface 14.

The brake shoe plate 20 and shoe 22 are attached to the piston by the following procedure. The plate 20 is positioned on either the caliper or the torque support member, according to the particular design, by means of ear tab portions 21 which have sliding support surfaces 23. The plate 20 is pushed axially toward the disc brake piston 10 which is housed within the caliper 11 of the disc brake so that resilient legs 36 enter into opening 12 of piston 10. As the legs enter into opening 12, the dimples 44 engage inner surface 14 of piston 10. Because a groove within inner surface 14 of the piston is not required, the plate 20 is pushed back until it abuts the end surface 13 of piston 10. Any movement of piston 10 or brake shoe plate 20 away from one another results in the bottom portions 46 biting into or gouging into surface 14 of opening 12. The movement of the piston away from the plate 20 would necessarily occur during the first release of the brakes wherein the hydraulic fluid of the disk brake recedes and the piston, via a seal disposed thereabout or other piston return mechanisms well known in the art, retracts inwardly of the caliper. As the piston returns to an at-rest or non-braking position, the lanced dimples 44 each gouge into or bite into the surface of piston 10 so that the plate 20 and shoe 22 are coupled to the piston and move therewith.

Piston 10 may comprise either a steel piston or a phenolic piston, or other suitable material, the lanced dimples 44 being able to bite into surface 14 of piston 10 by means of bottoms 46 which are curved and will, by means of the resiliency of the legs which are biased outwardly away from flat portion 34 and into engagement with surface 14, engage the surface 14. When legs 36 are positioned within opening 12, the legs are biased by surface 14 radially inwardly toward substantially flat portion 34 so there is a more than sufficient radially outwardly biasing reaction force for each leg against the inner surface 14.

Other provisions of the invention or variations will become apparent to those skilled in the art and will suggest themselves from the specific applications of the invention. It is intended that such variations and revisions of the invention as are reasonably to be expected on the part of those skilled in the art, to suit individual design preference and which incorporate the herein disclosed principles, will be included within the scope of the following claims as equivalents thereof.

We claim:

1. A brake shoe retainer for coupling a brake shoe to a piston of a disc brake, the retainer comprising a single-piece member having a substantially flat portion with reception means for receiving coupling means between the substantially flat portion and a brake shoe plate, the substantially flat portion extending into a plurality of resilient legs each of which extends away from a plane of said substantially flat portion, each leg comprising a leg portion disposed substantially orthogonally relative to said plane and the leg portion having a lanced dimple provided therein, the lanced dimple extending outwardly away from the substantially flat portion and having a curved surface disposed a predetermined distance from a plane of the leg portion so that the curved surface engages a smooth inner surface portion of an opening within the piston, the curved surface biting into the smooth inner surface portion when the brake shoe plate is displaced away from said piston so that the curved surface is the only part of the respective leg which engages the inner surface portion whereby said retainer couples said brake shoe plate to said piston for movement therewith.

2. The retainer in accordance with claim 1, wherein each leg portion extends further into an end portion which is angled relative to the respective leg portion, the end portion angled inwardly toward the substantially flat portion.

3. The retainer in accordance with claim 2, wherein each resilient leg comprises an angled base portion extending from the substantially flat portion to the leg portion.

4. The retainer in accordance with claim 3, wherein the means for coupling the retainer to the brake shoe plate comprises a pair of rivets.

5. The retainer in accordance with claim 4, wherein the piston comprises one of a phenolic piston and a metal piston.

6. A brake shoe retainer for coupling a brake shoe to a piston of a disc brake, the retainer comprising an integral member having a substantially flat portion with reception means for receiving coupling means between the substantially flat portion and a brake shoe plate, the substantially flat portion extending into a plurality of resilient legs each of which extends away from a plane of said substantially flat portion, each leg comprising a leg portion disposed substantially orthogonally relative to said plane, characterized in that the leg portion has a protrusion provided therein, the protrusion extending outwardly away from the substantially flat portion and having a curved surface disposed a predetermined distance from a plane of the leg portion so that said curved surface engages a smooth inner surface portion of an opening within the piston, the curved surface entering into said surface portion when the brake shoe plate is displaced away from said piston so that the curved surface is the only part of the respective leg which engages the inner surface whereby said retainer attaches said brake shoe plate to said piston for movement therewith.

7. The retainer in accordance with claim 6, characterized in that each leg portion extends further into an end portion which is angled relative to the respective leg portion, the end portion angled inwardly toward the substantially flat portion.

8. The retainer in accordance with claim 7, characterized in that each resilient leg comprises an angled base portion extending from the substantially flat portion to the leg portion.

9. The retainer in accordance with claim 8, characterized in that the means for coupling the retainer to the brake shoe plate comprises a pair of rivets.

10. The retainer in accordance with claim 9, characterized in that the piston comprises one of a phenolic piston and a metal piston.

* * * * *